United States Patent
Yamazaki et al.

(10) Patent No.: US 6,730,182 B2
(45) Date of Patent: May 4, 2004

(54) METHOD FOR VIBRATING, MELTING AND BONDING RESIN PARTS

(75) Inventors: Yasuhiko Yamazaki, Toyota (JP); Takayuki Shibata, Nagoya (JP); Syuuji Murata, Chita-gun (JP); Akihiro Yada, Yokkaichi (JP); Ryouji Iwamatsu, Kuwana (JP)

(73) Assignee: Denso Corporation, Kariya (JP)

( * ) Notice: Subject to any disclaimer, the term of this patent is extended or adjusted under 35 U.S.C. 154(b) by 133 days.

(21) Appl. No.: 10/056,134

(22) Filed: Jan. 24, 2002

(65) Prior Publication Data

US 2002/0100535 A1 Aug. 1, 2002

(30) Foreign Application Priority Data

Jan. 30, 2001 (JP) ........................................ 2001-022103
Nov. 20, 2001 (JP) ........................................ 2001-354598

(51) Int. Cl.$^7$ .............................................. B29C 65/06
(52) U.S. Cl. ...................................... 156/73.5; 156/64
(58) Field of Search ...................... 156/64, 69, 73.5, 156/292, 308.2, 309.6, 580

(56) References Cited

U.S. PATENT DOCUMENTS 4,584,037 A * 4/1986 Fortuna et al. ............... 156/69
4,919,987 A * 4/1990 Manner ....................... 428/60
4,993,007 A * 2/1991 Meister ....................... 368/294
6,017,141 A * 1/2000 Sugiyama et al. ........... 362/520
6,033,505 A * 3/2000 Sugiyama et al. ........... 156/73.5
6,159,317 A * 12/2000 Sugiyama et al. ........... 156/73.5

FOREIGN PATENT DOCUMENTS

| JP | 9-104070 | 4/1997 |
| JP | 10-264255 | 10/1998 |
| JP | 2000-52430 | 2/2000 |

* cited by examiner

*Primary Examiner*—James Sells
(74) *Attorney, Agent, or Firm*—Harness, Dickey & Pierce, PLC

(57) ABSTRACT

The present invention provides a method for vibrating, melting and creating well-bonded resin parts. Pressing the resin parts is started and then the pressing force is increased sharply to a predetermined value and the resin parts are vibrated to heat the resin part contact surfaces. After heat generation is started, the pressing force is increased gradually to a time, when the vibrating of the resin parts is finished, to push out the heated resin material from the contact surfaces. This exposes the new surface of the resin material which is heated at a low degree and thus can prevent the resin material at the contact surface from excessive heat and degradation. Thereafter, the vibration of the resin parts is stopped to solidify the resin material which is not degraded and is in a uniform, melted state throughout the contact surfaces.

16 Claims, 11 Drawing Sheets

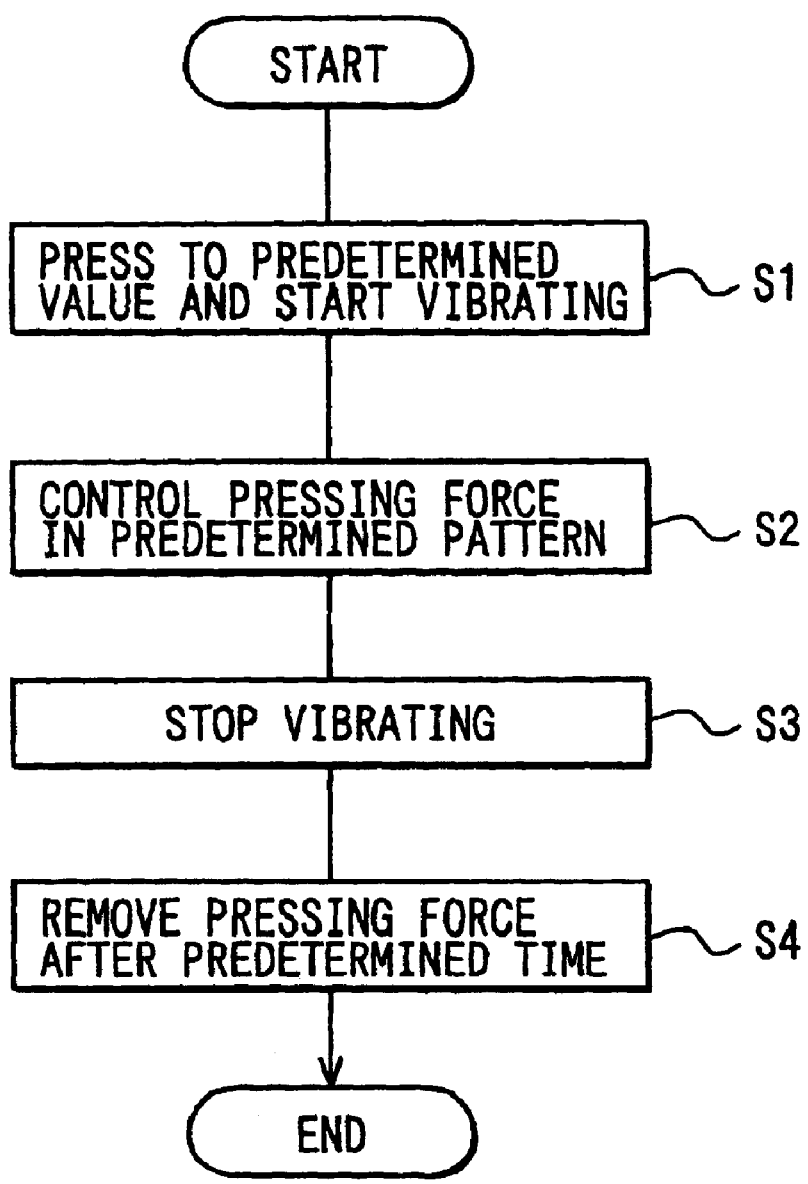

METHOD FOR VIBRATING, MELTING AND BONDING RESIN PARTS

CROSS REFERENCE TO RELATED APPLICATION

This application is based on and incorporates herein by reference Japanese Patent application No. 2001-22103 filed on Jan. 30, 2001 and Japanese Patent Application No. 2001-354598 filed on Nov. 20, 2001.

BACKGROUND OF THE INVENTION

1. Field of the Invention

The present invention relates to a method for vibrating, melting and bonding a plurality of resin parts in which the contact surfaces of resin parts are vibrated, to cause melting and subsequent bonding of the parts.

2. Description of the Related Art

In the background arts, there is a low cost vibrating, melting and bonding method as a method for bonding resin parts to each other. This method is performed as follows. First, while a plurality of resin parts are pressed onto each other, they are made to abut against each other and their contact surfaces are vibrated to melt the resin at the contact surfaces by the use of frictional heat generated by the vibration. Then, when the resin at the contact surfaces is melted, the vibration is stopped and the resin at the contact surfaces is cooled and solidified, thereby bonding the resin parts.

However, according to the conventional technique described above, when variations occur in the state of heating of the contact surfaces during the vibrating operation because of variations in the pressing force, the state or degree of melting of the resin at the contact surfaces varies. When the degree or state of melting of the resin at the contact surfaces varies, there is a problem that when the resin is cooled and solidified, a stable bonding state can not be obtained.

SUMMARY OF THE INVENTION

The present invention has been made in view of the problem of the conventional technology. It is an object of at least one embodiment of the present invention to provide a method for vibrating, melting and bonding resin parts capable of producing a bonded part in which the resin parts are stably bonded to each other.

In order to achieve the object described above, an aspect according to one embodiment of the invention is characterized, in FIG. 1, in that in a method for vibrating, melting and bonding at least two resin parts (7, 8) by making the at least two resin parts (7, 8) abut against each other and vibrating their contact surfaces (71 and 82 of FIG. 2) while applying a pressing force to them, the pressing force is sharply increased to a predetermined value P1 and then is gradually increased.

According to an embodiment of the invention, after a heating operation is started, the pressing force is increased sharply to the predetermined value P1 to facilitate heat generation. However, if the same pressing force is applied continuously to the contact surfaces (71, 82) of the resin parts (7, 8) after they are heated, the resin material at the contact surfaces (71, 82) is excessively heated and becomes degraded. For this reason, according to an embodiment of the present invention, after the pressing force reaches the predetermined value P1, the pressing force is gradually increased to push out the heated resin material from the contact surfaces (71, 82). This exposes a new surface of the resin material which is not heated so much and thus prevents the resin material at the contact surfaces (71, 82) from being excessively heated.

In this connection, since the contact surfaces (71, 82) of the resin parts (7, 8) are not completely flat, variations occur in heating the contact surfaces (71, 82) of the resin parts (7, 8). In order to obtain consistent melting and bonding throughout the contact surfaces (71, 82), it is necessary to apply heat as uniformly as possible throughout the contact surfaces (71, 82). Therefore, it is necessary to melt the resin material at the contact surfaces (71, 82) in a uniform manner to achieve consistency in heating the contact surfaces (71, 82). In this case, even if variations occur in heating the contact surfaces (71, 82) of the resin parts (7, 8), it is possible to prevent parts of the resin material from being excessively heated.

In this manner, by preventing the resin material at the contact surfaces (71, 82) of the resin parts (7, 8) from being excessively heated, it is possible to solidify the resin material which does not deteriorate and is nearly uniform in the state of melting throughout the contact surfaces (71, 82) to produce a well-bonded part. Additionally, the pressing force is continuously and gradually increased until the vibrating of the contact surfaces is finished. This makes it possible to prevent the resin material from being excessively heated by the heat generated by the vibrating operation.

In another aspect, the pressing force is continuously gradually increased from the predetermined value P1 in a range not exceeding a predetermined upper limit pressing force P2. If the pressing force exceeds the predetermined upper limit pressing force P2, the resin material is removed from the contact surfaces before the resin material is sufficiently heated and thus there is the possibility that acceptable bonding can not be achieved. For this reason, it is effective to increase the pressing force gradually in the range so as not to exceed the predetermined upper limit pressing force P2. Alternatively, the pressing force may be continuously gradually increased by a combination of a period in which the pressing force is held at a constant value and a period in which the pressing force is increased. In order to increase the pressing force gradually, of course, the pressing force may be increased continuously (linearly), and an increasing gradient of the pressing force may be increased gradually as a whole by combining the period in which the pressing force is held at a constant value with the period in which the pressing force is increased.

With respect to vibration, after the vibrating of the contact surfaces is started, a moving speed of the contact surfaces (71, 82) may be sharply increased to a predetermined upper limit and the moving speed may thereafter be decreased gradually. According to an embodiment of the invention, after the vibrating operation is started, by sharply increasing the moving speed to the predetermined upper limit, heating is facilitated to melt the resin material at the contact surfaces (71, 82). By decreasing the moving speed gradually after the resin material at the contact surfaces (71, 82) of the resin parts (7, 8) is heated and melted, heat generation is decreased to prevent the resin material at the contact surfaces from being excessively heated, which may promote material degradation. Therefore, it is possible to solidify the resin material which is not yet degraded and in a state of melting to obtain a well-bonded part.

Continuing with an embodiment of the preset invention, the position of one 8 of the two resin parts (7, 8) is measured as the amount of melting M of the resin parts (7, 8) at the contact surfaces (71, 82) with reference to the other resin part 7, is in progress. A determination is made whether the amount of melting M increases with the lapse of time or not; and on the basis of the determination result, a determination is made whether the melting and bonding of the resin parts (7, 8) is acceptable.

In the related art, when the amount of melting at the contact surfaces of the resin parts reaches a predetermined amount, the vibrating operation is stopped and the melting resin material at the contact surfaces is solidified to complete the bonding of the contact surfaces. In the case where variations occur in the state of melting of the resin material at the contact surfaces because of variations in heating when the vibrating operation is carried out, the amount of melting hardly increases (or may only increase a little) until the resin material at the portion where heat generation does not yet progress is sufficiently heated and melted. Then, when the whole contact surface is melted, the amount of melting increases at a portion and reaches a predetermined amount, but the resin material at the portion where the heat generation progresses from the start is excessively heated and becomes degraded.

For this reason, in an embodiment of the present invention, a determination is made whether the amount of melting M increases with the lapse of time, and in the case where the amount of melting M is increased with the lapse of time, it is possible to determine that the resin material being excessively heated and degraded is not at the contact surfaces. Therefore, it is possible to determine, on the basis of the result of determination on whether the amount of melting M increases with the elapse of time or not, whether the melting and bonding is good or not. In this manner, it is possible to obtain the bonded part in which the resin parts (7, 8) are well bonded.

The result of the determination on whether the amount of melting M increases with the lapse of time or not can be obtained by determining whether or not the amount of melting M is within a range from an upper limit to a lower limit (U, J) both of which increase with the lapse of time, or by determining whether or not the target amount of melting is obtained within the predetermined time.

Further, in another aspect, one resin part 7 of at least two resin parts (7, 8) has a projection 72 on its outer peripheral surface. The resin part 7 is pressed into the holding portion 6a of a vibrating jig 6 to fix the vibrating jig 6. The vibrating jig 6 is vibrated in this state to vibrate the contact surfaces (71, 82).

In the related art, in a general method for vibrating, melting and bonding resin parts, a small clearance is made between a holding portion of the vibrating jig and the outer peripheral surface of the resin part mounted on the vibrating jig. This clearance causes a loss of energy in transmission while the vibrating operation is performed and a variation in clearance produces a variation in vibration energy transmitted to the contact surfaces of the resin parts.

In an embodiment of the present invention, since the resin part 7 has the projection 72 on its outer peripheral surface and the resin part 7 is pressed into the holding portion 6a of a vibrating jig 6 to fix the vibrating jig 6, the vibration energy can be accurately transmitted. Therefore, the present invention hardly produces a variation in the vibration energy transmitted to the contact surface 71 of the resin part 7 and can produce a bonded part in which the resin parts (7, 8) are well-bonded.

Further, one resin part 7 may be fixed to the vibrating jig 6 and another resin part 108 maybe fixed to a stationary jig 13, the vibrating jig 6 is vibrated to vibrate the contact surfaces (71, 82). The stationary jig 13 has receiving surfaces (114, 115) in accordance with the shape of the other resin part 108 and causes a uniform pressing force to be applied to the contact surfaces (71, 82) when the contact surfaces (71, 82) are vibrated.

According to this embodiment of the invention, even if the resin part 108 fixed to the stationary jig 13 is formed in a complex shape, it is possible to make the pressing force applied to the contact surfaces (71, 82) uniform when the contact surfaces (71, 82) are vibrated. Therefore, there is hardly a variation in the state of heating of the resin material at the contact surfaces (71, 82). In this manner, it is possible to produce a well-bonded part with the resin parts (7, 108). Further, the receiving surfaces (114, 115) of the stationary jig 13 are provided with a movable part 115, and the movable part 115 can move according to the shape of the other resin part 108, and when the contact surfaces (71, 82) are vibrated, the movable part 115 can be fixed to cause a uniform pressing force against the contact surfaces (71, 82).

Further, contact surface 82 is formed so as to make the rigidity of the resin part nearly uniform at each portion of the contact surface 82. If the resin parts of the contact surfaces are different in rigidity between respective portions thereof, the portion having lower rigidity is vibrated in synchronization with the vibration, when they are vibrated, and thus does not generate heat as much as the portion having higher rigidity. In this manner, if the resin parts of the contact surfaces are different in rigidity between respective portions thereof, heat generation progresses in the portion having higher rigidity and results in non-uniform heating. Therefore, this results in varying the state of melting of the resin material at the contact surfaces and does not produce good bonding.

In an embodiment of the present invention, since the contact surface 82 is formed such that the rigidity of the contact surface 82 of the resin part is nearly uniform, variations are unlikely to occur in heating the resin material of the contact surface 82. Therefore, it is possible to produce a bonded part in which the resin parts are well-bonded to each other.

Further, when the contact surface 82 is formed in a polygonal shape, by making the thickness of the resin part of the corner 811 of the resin part thinner than that of the straight portion 812 of the resin part, the rigidity of the resin part can be made nearly uniform at each portion of the contact surface 82.

In a state where one resin part 7 is fixed to the vibrating jig 6 and the other resin part 8 is fixed to the stationary jig 13, the vibrating jig 6 is vibrated to vibrate the contact surfaces (71, 82), and the other resin part 8 has a polygonal rib portion 81 whose top surface is the contact surface 82, and the thickness W1 of the rib portion 81 at its corner portion 811 is made thinner than the thickness W2 of the rib portion 81 at a straight portion 812, thereby making the rigidity of the resin part nearly uniform at each portion of the contact surface 82. Still further, in another aspect, at least one resin part 208 has a step at the contact surface 282 and that a portion 912 having a higher rigidity of the resin part at the contact surface 282 is projected from a portion 911 having a lower rigidity of the resin part at the contact surface 282.

Accordingly, it is possible to make heat generation progress earlier at the portion 912 having lower rigidity of the resin parts of the contact surface 282. Therefore, it is possible to prevent uneven and inconsistent heating of the resin material at the contact surface 282 and thus to produce a bonded part in which the resin parts (7, 208) are well-bonded.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a flowchart showing a general control operation of a control unit of the first embodiment in accordance with the present invention;

DETAILED DESCRIPTION OF THE PREFERRED EMBODIMENTS

The preferred embodiments in accordance with the present invention will be described in the following.

(First Embodiment)

Figure 1:
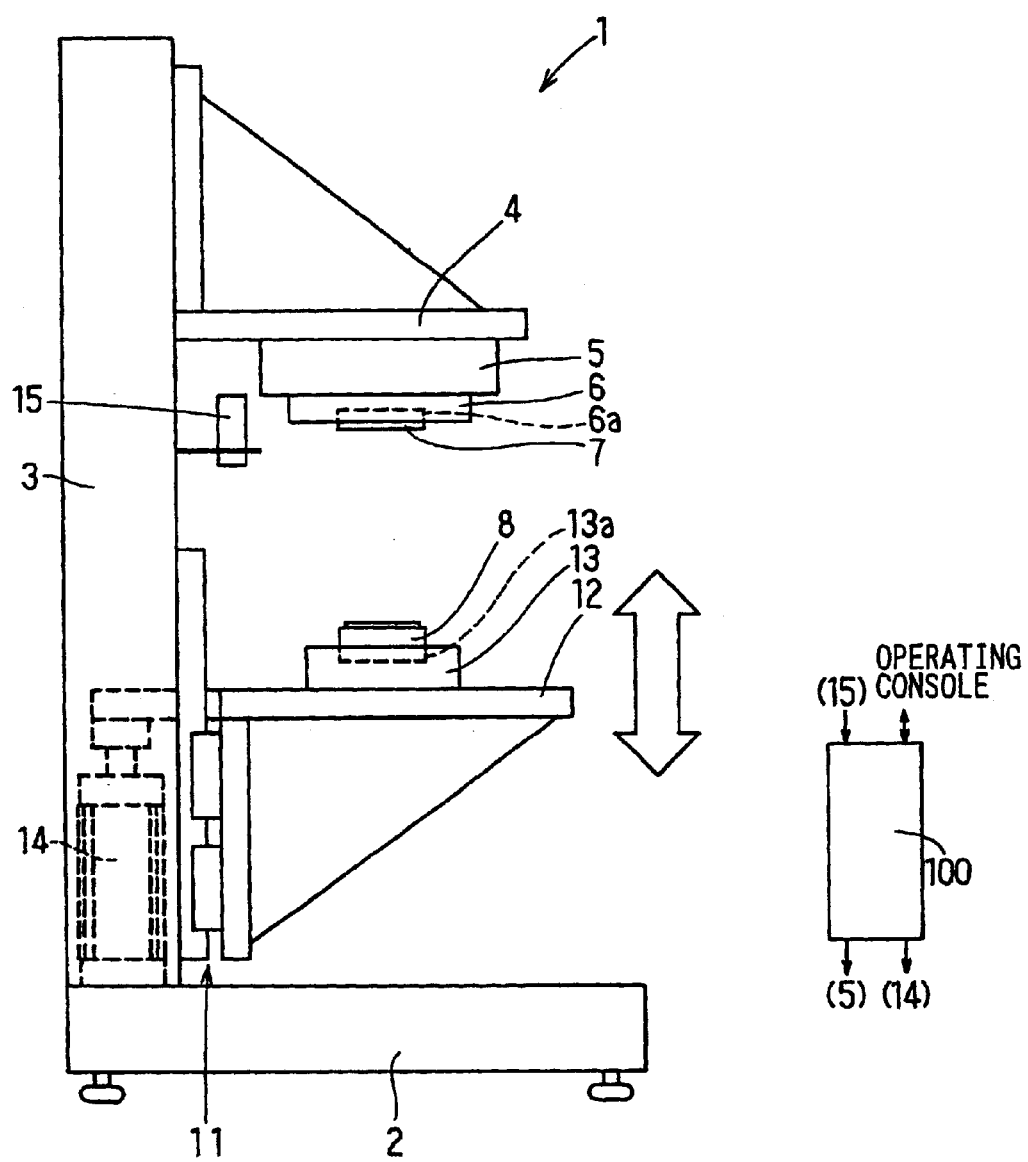
FIG. 1 is a schematic diagram of a vibrating melting and bonding machine of a first embodiment in accordance with the present invention.

FIG. 1 is a schematic configuration of a vibrating, melting and bonding machine 1 in accordance with an embodiment of the present invention.

In FIG. 1, reference numeral 2 denotes a base, and a frame 3 extending in a longitudinal direction is mounted on the base 2. On the upper side portion of the frame 3, a vibrating body 5 for vibrating a vibrating jig 6 to be described below is supported via a support member 4. In the vibrating body 5, three driver coils (not shown) are disposed and when three phase alternating current is passed through these three coils, a resonating body (not shown) to which the vibrating jig 6 is fixed is moved along an arc in a horizontal plane. While the vibrating body 5 moving along the arc is adopted in the present embodiment, a vibrating body reciprocating in one axial direction in the horizontal plane may be employed.

On the lower side portion of the frame 3, a table 12 to which a stationary jig 13, to be described below, is fixed is supported via a slide unit 11 in such a way that it can slide in vertical directions. The table 12 is moved up and down by the operation of a hydraulic cylinder 14 provided in the frame 3. Although the table 12 can be moved by means of an air cylinder, the use of the hydraulic cylinder is preferred for accuracy in controlling a pressing force when a vibrating, melting and bonding operation is employed.

Further, a gap sensor 15 for detecting the position of the table 12 is disposed on the side portion of the frame 3 slightly above the top end of the movable region of the table 12. In the present embodiment, a non-contact type gap sensor for detecting a change in the magnitude of an eddy current generated according to the magnitude of the gap is employed as the gap sensor 15. A sensor to detect the position of the table 12 is not limited to this type of sensor, but other sensors may be used such as a non-contact type sensor using laser(s) or a contact type length measuring unit which is put into contact with an object to measure a gap.

The vibrating jig 6 is provided with a holding part 6a formed in the shape of a depression on the bottom surface side to hold a cover 7 which is one resin part of two resin parts to be vibrated, melted and bonded, as described below. Further, the stationary jig 13 is provided with a holding part 13a formed in the shape of a depression on the top surface side to hold a case 8 which is the other part of the two resin parts to be vibrated, melted and bonded. Then, when the cover 7 and the case 8 are mounted in the holding parts 6a and 13a, respectively, the contact surfaces of the cover 7 and the case 8 when they are vibrated, melted and bonded are opposed to each other. Further, a control unit 100 is a control means for operating and controlling the vibrating body 5 and the hydraulic cylinder 14 on the basis of a signal from the operating switch of an operating console (not shown) and a signal from the gap sensor 15.

Figure 2A:
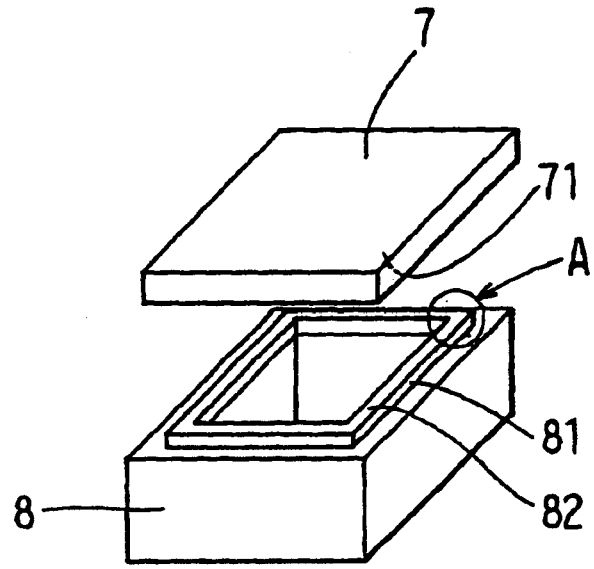
FIG. 2A is a perspective view of a resin part of the first embodiment in accordance with the present invention.
Figure 2B:
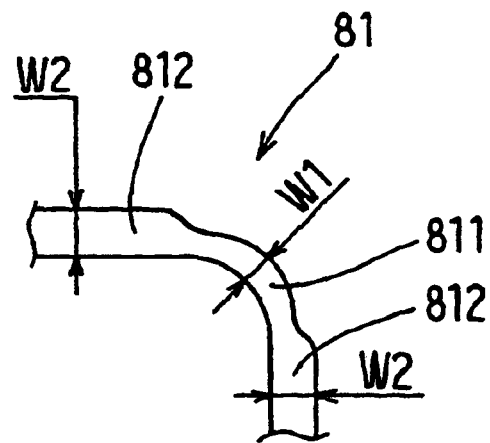
FIG. 2B is a plan view of a resin part of the first embodiment in accordance with the present invention.

FIGS. 2A and 2B illustrate a schematic structure of resin parts to be vibrated, melted and bonded in an embodiment of the present invention. FIG. 2A is a perspective view of the cover 7 and the case 8, both of which are resin parts, and FIG. 2B shows the shape of a main portion in FIG. 2A.

As shown in FIG. 2A, the cover 7 is a resin part shaped like a flat plate and the case 8 is a resin part shaped like a rectangular cylinder with a bottom. In the present embodiment, an electronic circuit or the like is received in the case 8, and the cover 7 and the case 8 are melted and bonded to each other to form a hermetical state so as to protect the electronic circuit or the like from an outside environment. For this reason, a polygonal (square in this embodiment) rib portion 81 is formed on the top surface of the case 8. When the cover 7 and the case 8 are vibrated, melted and bonded, the top surface of the rib portion 81 and the outer peripheral portion of the bottom surface of the cover 7 opposed thereto become the respective contact surfaces 82 and 71.

In this connection, in this embodiment of the present invention, a resin material made of poly(butylene phthalate) including 30% glass fibers is used as the cover 7 and the case 8 to meet requirement properties such as environmental resistance and strength. Further, the case 8 is provided with the rib portion 81 of approximately 2.5 mm in height.

FIG. 2B is an enlarged plan view of a portion A in FIG. 2A in which the portion, except for the rib portion 81, is omitted. As shown in FIG. 2B, in the rib portion 81, a corner portion 811 is different in thickness (width of contact surface 82) from a straight portion 812. In the present embodiment, the thickness W1 of the corner portion 811 is set at 0.9 mm and the thickness W2 of the straight portion is set at 1.2 mm.

If the rib portion 81 is formed such that the thickness W1 is equal to the thickness W2, rigidity to vibration in the horizontal direction is lower in the straight portion 812 than in the corner portion 811. Then, when the rib portion 81 is vibrated, melted and bonded, the straight portion 812 having lower rigidity is apt to synchronize with the generated vibrations and deflect, thus generating a smaller amount of frictional heat than the corner portion 811 and corner portion 811 becomes non-uniform in the state of heating. As described above, by thinning the thickness W1 with respect to the thickness W2, it is possible to make the rigidity of each portion of the rib portion 81 nearly equal and to reduce variations in the state of heating when the rib portion 81 is vibrated, melted and bonded.

Figure 3A:
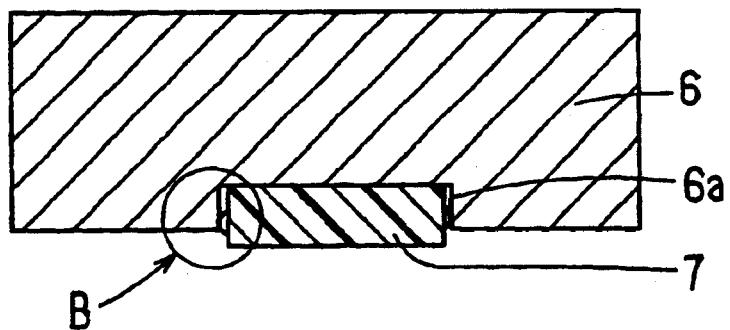
FIG. 3A is a cross-sectional view showing an engaging relationship between a vibrating jig and a cover of the first embodiment in accordance with the present invention.
Figure 3B:
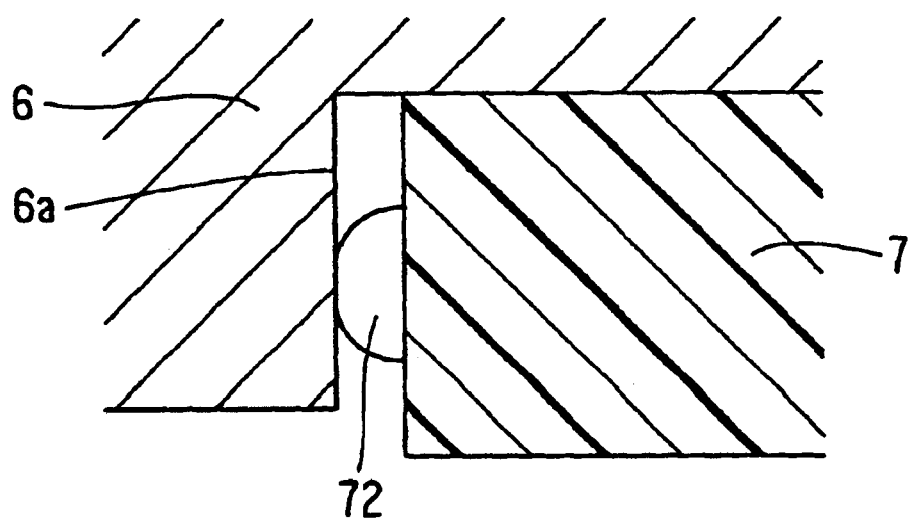
FIG. 3B is an enlarged view of a main portion of an engaging relationship between a vibrating jig and a cover of the first embodiment in accordance with the present invention.

FIGS. 3A and 3B show a sectional view of a state where the cover 7 is held by the holding portion 6a of the vibrating jig 6. As shown in FIG. 3A, the top surface of the cover 7 is fixed at the position where it abuts against the bottom surface of the holding portion 6a. FIG. 3B is an enlarged view of a portion B of FIG. 3A. The cover 7 is provided with a semispherical projection 72 on an outer peripheral surface. Although partially omitted in FIGS. 3A and 3B, in the present embodiment, eight projections 72 are formed on the entire outer peripheral surface of the cover 7.

Each of the projections 72 is formed such that the width of the cover 7 is a little larger than the width of the holding portion 6a and when the cover 7 is pressed into and fixed in the holding portion 6a, the tip end of the projection 72 is deformed from about 0.1 mm to about 0.2 mm, thereby being securely held by the side surfaces of the holding portion 6a. Therefore, when the cover 7 is vibrated, melted and bonded, vibrational energy is accurately transmitted to the cover 7 from the vibrating jig 6.

Next, a vibrating, melting and bonding method in the foregoing configuration will be described. FIG. 4 is a flowchart showing the general control operation of a control unit 100. First, the cover 7 is fixed to the holding portion 6a of the vibrating jig 6 of the vibrating, melting and bonding machine 1 shown in FIG. 1, and the case 8 is fixed to the holding portion 13a of the stationary jig 13. Then, when the operating switch of the operating console (not shown) is turned on, the hydraulic cylinder 14 is operated by a signal from the control unit 100 and moves the table 12 toward support member 4.

This operation makes the contact surface 71 of the cover 7 abut against the contact surface 82 of the case 8, which are shown in FIG. 2A, to press them against each other. A pressing force is increased sharply until the pressing force reaches a predetermined value P1 (for instance, 0.28 MPa) as shown by a solid line C in FIG. 5 and the vibration body 5 is vibrated (step S1). In this embodiment, for example, the vibration body 5 is vibrated at a frequency of 200 Hz and an amplitude of 0.48 mm.

Figure 5:
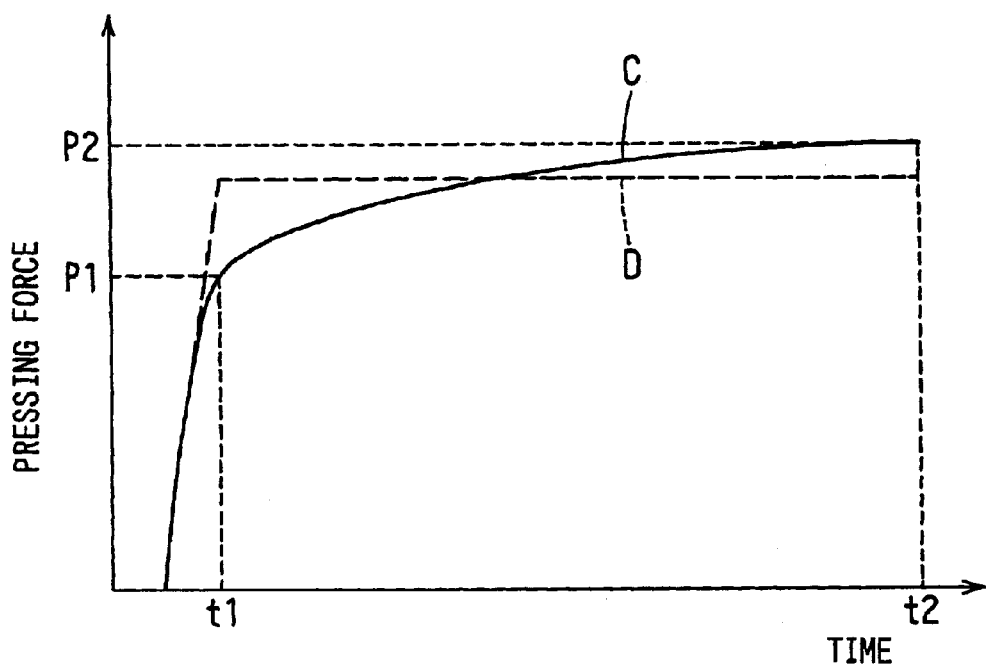
FIG. 5 is a graph showing a pressing force control pattern of the first embodiment in accordance with the present invention.

Then, the pressing force is continuously gradually increased along a predetermined pattern shown in FIG. 5 until the pressing force reaches a predetermined pressing force P2 (for instance, 0.30 MPa). In this embodiment, for example, it takes 15 seconds when the pressing force is increased from P1 to P2, that is, the contact surface 71 of the cover 7 and the contact surface 82 of the case 8 are pressed against each other and vibrated for 15 seconds (from t1 to t2), as shown in FIG. 4.

According to this operation, when the pressing force is sharply increased to P1, the contact surfaces 71 and 82 are vibrated against each other to generate frictional heat. However, even after the resin materials at the contact surfaces 71 and 82 are heated, if they are continuously pressed at the same pressing force as shown by a broken line in FIG. 5, the resin materials at the contact surfaces 71 and 82 are excessively heated and become degraded. In the present embodiment, even after the pressing force reaches the predetermined value P1, the pressing force is gradually increased to push out the heated resin materials from the contact surfaces 71 and 82. Thereby, a new resin material surface having a low heating degree is exposed to prevent the resin material at the contact surfaces 71 and 82 from being excessively heated.

Continuing, there is also a case where the contact surfaces 71 and 82 of the cover 7 and the case 8 are not completely flat. In this case, variations occur in the state of heating the contact surfaces 71 and 82. In order to produce acceptable melting and bonding throughout the contact surfaces 71 and 82, the process of heating entire contact surfaces 71 and 82 needs to be made as uniform as possible. Accordingly, it is necessary to melt the resin materials at the contact surfaces 71 and 82 until heating becomes nearly uniform throughout the contact surfaces 71 and 82. In this case, even if variations occur in the state of heating of the contact surfaces 71 and 82, it is possible to prevent the portion of resin material previously heated from being overheated, by the method described above.

When the pressing force reaches P2, the vibration of the vibrating body 5 is stopped (step S3) and the pressing force is removed after a predetermined time (3 seconds in this embodiment) (step S4). The pressing force P2 is applied and then the vibration is stopped. During the predetermined time in which the vibration is stopped, the resin materials at the contact surfaces 71 and 82 are cooled and solidified, whereby the melting and bonding of the cover 7 and the case 8 are completed.

Figure 6:
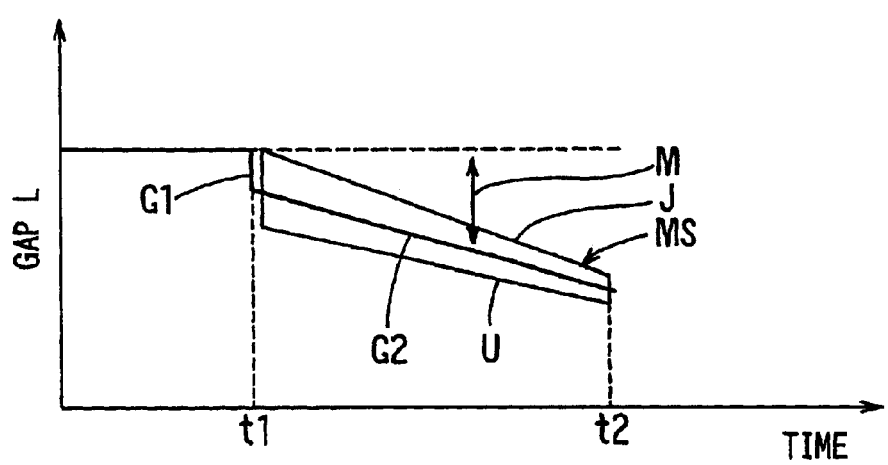
FIG. 6 is a graph showing the relationship between the amount of melting and a range for determining whether the melting and bonding operation is well carried out or not of the first embodiment in accordance with the present invention.

Although not shown in FIG. 4, while the steps S1 and S2 are executed, the control unit 100 measures the position of the table 12 (the gap L between the gap sensor 15 and the table 12) on the basis of the signal from the gap sensor 15, as shown in FIG. 6. Here, although the gap L continuously decreases until the cover 7 abuts against the case 8, the gap L is not measured regardless of the signal from the gap sensor 15 because the gap L is not related to the melting and bonding of the cover 7 and the case 8.

When the cover 7 abuts against the case 8 and the pressing force increases sharply to the predetermined value and the contact surfaces 71 and 82 are vibrated, the resin materials at the contact surfaces 71 and 82 start generating heat and melt. During this process, the gap L sharply decreases like a solid line G1 shown in FIG. 6. Then, as the pressing force increases gradually, the gap L decreases like a solid line G2 shown in FIG. 6. A change in the gap L indicates a change in the position relationship between the cover 7 and the case 8 and thus the difference M between the gap L when the cover 8 abuts against the case 8 and the solid lines G1 and G2 indicates the amount of melting at the contact surfaces 71 and 82 of the cover 7 and the case 8.

Therefore, while the steps S1, S2 are executed, the control unit 100 measures the amount of melting M of the contact surfaces 71 and 82 of the cover 7 and the case 8 and determines whether the amount of melting M increases with time or not. This determination is made by determining whether the gap L indicating the amount of melting M is within a range MS, shown in FIG. 6, or not.

The range MS is determined by the upper limit U and the lower limit J of the amount of melting M increasing with time between a time t1 and a time t2. In this embodiment, the range MS is determined such that the difference between the upper limit U and the lower limit J at the time t1 is 0.6 mm, and the difference between the upper limit U and the lower limit J at the time t2 is 0.2 mm. The reason why the range MS is determined in this manner is that the state of melting of the resin material near the completion of a melting and bonding process has a greater effect on stabilizing the state of melting and bonding after cooling and solidifying compared to the state of melting of the resin material at the initial stage of the melting and bonding process.

In the case where the gap L is smaller than the upper limit U of the amount of melting M, the amount of melting M is too large. In this case, there is the possibility that the resin materials yet to be heated and melted sufficiently at the contact surfaces 71 and 82 will be pushed out from the contact surfaces 71 and 82 and thus a good state of melting and bonding will not be obtained when the resin materials are finally cooled and solidified.

On the other hand, in the case where the gap L is larger than the lower limit J of the amount of melting M, the amount of melting M is too small. In this case, since the resin materials are excessively heated and degraded at the contact surfaces 71 and 82, a good state of melting and bonding can not be obtained when the resin materials are cooled and solidified. Therefore, by determining whether the gap L is within the range MS or not, a determination is made whether the state of melting and bonding is good or not. Then, the control unit 100 indicates this determination result on the display part of the operating console (not shown). In this manner, it is possible to determine whether the state of melting and bonding of the melted and bonded parts is good or not.

According to the above-mentioned configuration and method for vibrating, melting and bonding the resin parts, it is possible to reduce variations in the state of heating when the resin parts are vibrated, melted and bonded by making the structure, with respect to rigidity, of the rib portion 81 of the case 8 nearly uniform. Further, since the projections 72 are provided on the outer peripheral surface of the cover 7 and the cover 7 is pressed into and fixed in the holding part 6a, when the cover 7 and the case 8 are vibrated, melted and bonded to each other, vibration energy can be accurately transmitted from the vibrating jig 6 to the cover 7.

Further, since the contact surfaces 71 and 82 are made to abut against each other and then the pressing force is sharply increased to the predetermined value P1 and continuously gradually increased to the predetermined value P2, it is possible to prevent the resin materials at the contact surfaces 71 and 82 from being excessively heated. According to this configuration and method, it is possible to obtain a bonded part in which the cover 7 and the case 8 are melted and bonded to each other in the stable state.

Still further, since the amount of melting of the cover 7 and the case 8 is monitored continuously while they are vibrated, melted and bonded to each other, even when case parts are not melted and bonded in a good state, it is possible to discriminate the parts from good ones. Therefore, it is possible to accurately obtain a bonded part in which the cover 7 and the case 8 are melted and bonded in a stable state.

(Second Embodiment)

Next, a second embodiment will be described based on the drawings. In a second embodiment, the shape of a case which is a resin part and the structure of a stationary jig for fixing the case are different from those in the first embodiment. Here, the same parts in the second embodiment as those in the first embodiment are designated by the same reference characters in the first embodiment, so the description of those parts is omitted.

Figure 7:
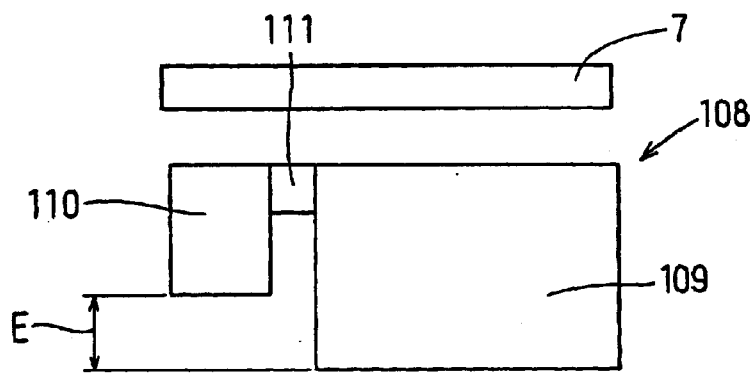
FIG. 7 is a schematic diagram of a resin part of a second embodiment in accordance with the present invention.

A case 108 in the present embodiment, as shown in FIG. 7, is constituted by a first box 109 and a second box 110 which are joined by a joining part 111. Then, when the case 108 is integrally formed of resin, the difference E in height between the bottom surface of the first box 109 and the bottom surface of the second box 110 is apt to vary.

Figure 8A:
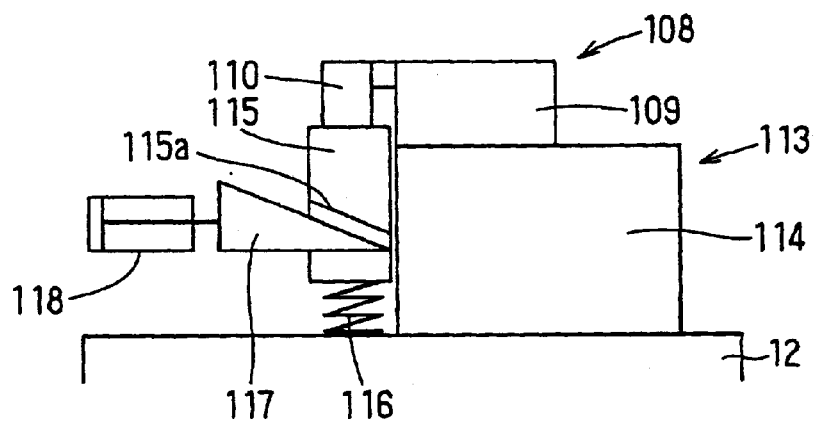
FIG. 8A is a schematic diagram showing the engaging relationship between a case and a stationary jig of the second embodiment in accordance with the present invention.

FIG. 8A is an illustration showing the configuration and operation for fixing the case 108 to a stationary jig 113. Here, in FIGS. 8A and 8B, of the configuration of the stationary jig 113, the configuration for holding the side surface of the case 108 is omitted. As shown in FIG. 8A, the stationary jig 113 is provided with a fixed part 114 for supporting the bottom surface of the first box 109 and a movable part 115 for supporting the bottom surface of the second box 110. The fixed part 114 and the movable part 115 constitute the receiving surface of the stationary jig 113 in the present embodiment. Then, between the movable part 115 and a table 12 provided is a spring 116 or an elastic member.

Figure 8B:
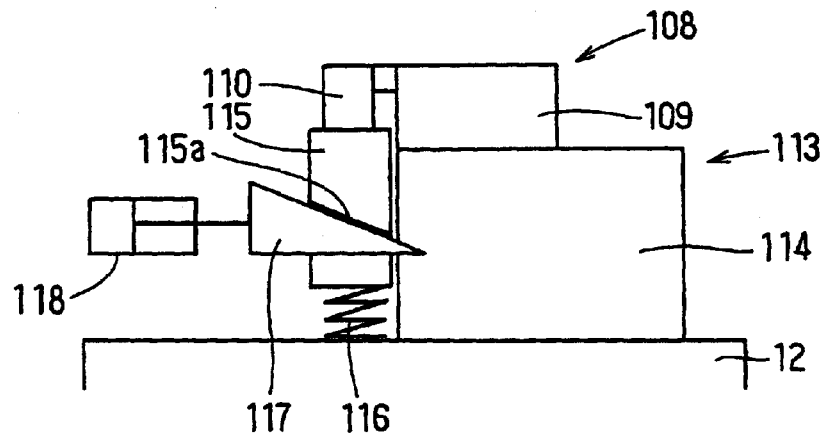
FIG. 8B is a schematic diagram showing the engaging relationship between a case and a stationary jig of the second embodiment in accordance with the present invention.

The movable part 115 is provided with a slanting surface 115a facing downward (the downward surface is perpendicular to the face of the paper in FIGS. 8A and 8B). Further, a wedge part 117 is arranged on the left side of the slanting surface 115a. The wedge part 117 can be made to abut against and be separated from the slanting surface 115a by the operation of a cylinder 118 connected to the wedge part 117.

Next, the operation of the stationary jig 113 will be described. As shown in FIGS. 8A and 8B, when the case 108 is mounted on the stationary jig 113, the wedge part 117 is separated from the slanting surface 115a. When the case 108 is held by the stationary jig 113, the spring 116 is deformed to absorb variations in a size E, thereby putting the bottom surface of the first box 109 in contact with the fixed part 114 and putting the bottom surface of the second box 110 into close contact with the movable part 115. Here, the elastic member is not limited to a spring but may be any member capable of being elastically deformed to the extent it can absorb variations in the size E.

When the boxes 109 and 110 are put into contact with the fixed part 114 and the movable part 115, respectively, the cylinder 118 is operated. Thereby, as shown in FIG. 8B, the wedge part 117 is moved to the right and is made to abut against the slanting surface 115a. Here, it is preferable that the pressing force applied to the cylinder 118 is made small enough not to lift up the movable part 115 when the wedge part 117 abuts against the slanting surface 115a. In this manner, when the wedge part 117 abuts against the slanting surface 115a, the wedge part 117 is fixed to the stationary jig 113 by a lock pin (not shown) and the movable part 115 is brought to a non-movable state. Then, according to the same procedures of the first embodiment, the cover 7 and the case 8 are vibrated, melted and bonded to each other. At this time, although the case 108 is pressed from above, since the movable part 115 is in the non-movable state, the pressing force applied to the second box 110 is not decreased.

According to the aforementioned configuration and operation, it is possible to produce the same effect as the first embodiment. In addition, even if there are variations in the size E on the bottom surface side of the case 108 fixed to the stationary jig 113, it is possible to make the pressing force applied to the contact surfaces uniform when the contact surfaces are vibrated. Therefore, it is possible to prevent variations from occurring during heating of the resin materials at the contact surfaces. In this manner, it is possible to obtain a part in which the cover 7 and the case 108 are bonded in the stable state of bonding.

(Third Embodiment)

Next, a third embodiment will be described based on the drawings. In a third embodiment, the shape of the rib portion of a case, which is a resin part, is different from that in the first embodiment. Here, parts in the third embodiment that are the same as those in the first embodiment are designated by the same reference characters so the description of those same parts is omitted.

Figure 9A:
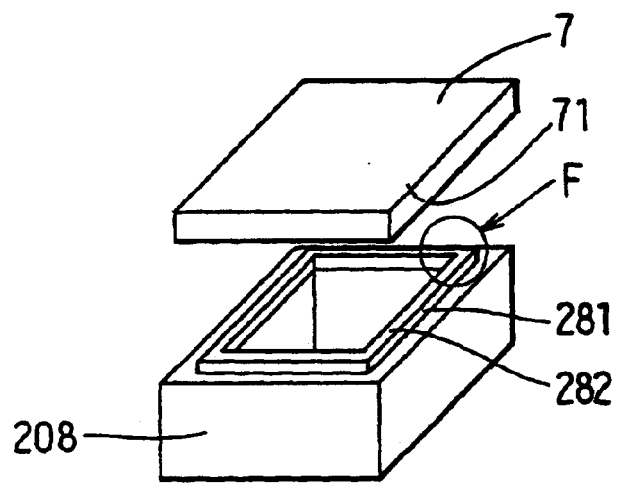
FIG. 9A is a perspective view of a schematic configuration of a resin part of the first embodiment in accordance with the present invention.
Figure 9B:
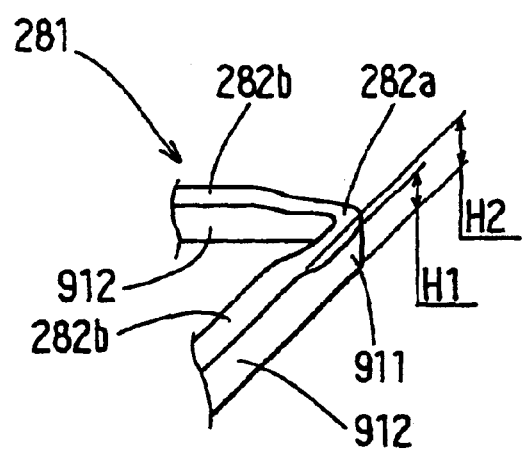
FIG. 9B is a perspective view of a main portion of a resin part of the first embodiment in accordance with the present invention.

FIGS. 9A and 9B are illustrations showing a schematic structure of a resin part to be vibrated, melted and bonded in an embodiment of the present invention. FIG. 9A is a perspective view of a cover 7 and a case 208, both of which are resin parts, and FIG. 9B shows the shape of a main portion F of FIG. 9A. As shown in FIG. 9A, a polygonal (square in this embodiment) rib portion 281 is formed on the top surface of the case 208 and when the rib portion 281 is vibrated, melted and bonded, the top surface of the rib portion 281 and the outer peripheral portion of the bottom surface of the cover 7 opposed thereto become the respective contact surfaces 282 and 71.

FIG. 9B is an enlarged perspective view of a portion F shown in FIG. 9A in which all, except the rib portion 281, is omitted. As shown in FIG. 9B, in the rib portion 281, a corner portion 911 is different in height, with respect to the contact surface 282, from a straight portion 912, that is, the contact surface 282 is stepped. In the present embodiment, the height H1 of the contact surface 282a of the corner portion 911 is set at 2.2 mm and the height H2 of the contact surface 282b of the straight portion 912 is set at 2.5 mm.

If the rib portion 281 is formed such that the height H1 is equal to the height H2, rigidity due to vibration in the horizontal direction is lower in the straight portion 912 than in the corner portion 911. Then, when the straight portion 912 having a lower rigidity is vibrated, melted and bonded, the straight portion 912 is apt to synchronize with the vibrational movement and deflect and thus generate a smaller amount of frictional heat than the corner portion 911. This makes the state of heating in the rib portion 281 non-uniform.

As described above, by lowering the height H1 with respect to the height H2, in other words, by forming the contact surface 282b of the straight portion 912 having lower rigidity in such a way as to protrude from the contact surface 282a of the corner portion 911 having higher rigidity, when the rib portion 281 is vibrated, melted and bonded, it is possible to start heating the straight portion 912, before corner portion 911, the straight portion 912 having lower rigidity, to reduce variations in the state of heating of the respective portions of the rib portion 281. In this manner, it is possible to obtain a bonded part in which the cover 7 and the case 208 are melted and bonded to each other in a stable state.

(Other Embodiments)

In the respective embodiments described above, when the vibrating, melting and bonding operation is performed, as shown in the steps S1 and S2 shown in FIG. 4, the pressing force control is performed in which after the pressing operation is started, the pressing force applied to the contact surfaces is sharply increased to the predetermined value and then is continuously gradually increased. However, the vibrating body 5 may be controlled as follows: the pressing force is controlled in the manner shown by a broken line D in FIG. 5, then after vibration is started, the moving speed when the contact surfaces are vibrated is sharply increased to a predetermined upper limit and then the moving speed is gradually decreased.

According to this control, after the vibration is started, the moving speed is sharply increased to the predetermined upper limit to accelerate heat generation to melt the resin materials at the contact surfaces. By gradually decreasing the moving speed, after the resin materials at the contact surfaces of the cover and the case generate heat and melt, it is possible to reduce the amount of heat and to prevent the resin materials at the contact surfaces from being excessively heated and degraded. Therefore, by solidifying the resin materials yet to deteriorate during the state of melting, it is possible to obtain a bonded part in which the resin parts are bonded in the stable state.

Figure 10A:
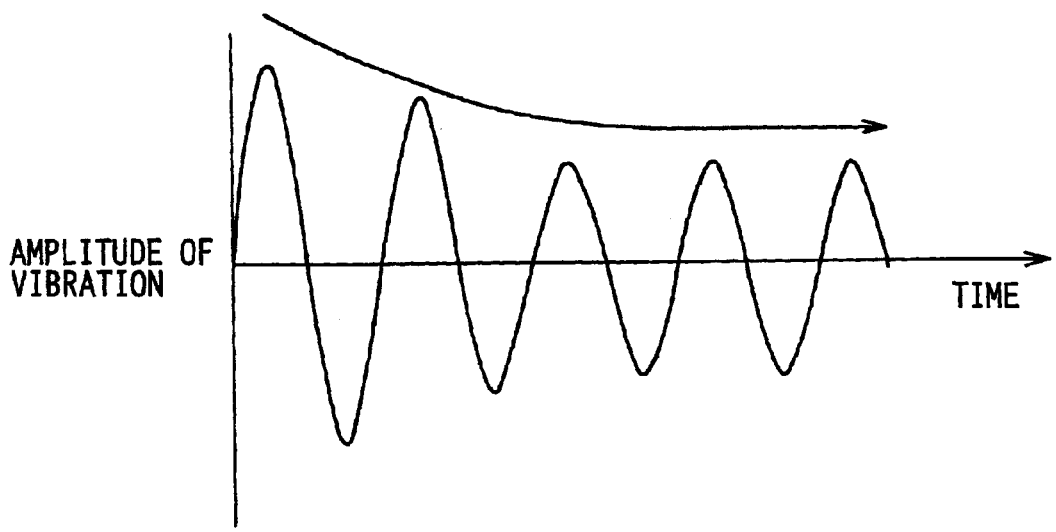
FIG. 10A is graph showing a control example of a moving speed during a vibrating operation of another embodiment of the present invention.
Figure 10B:
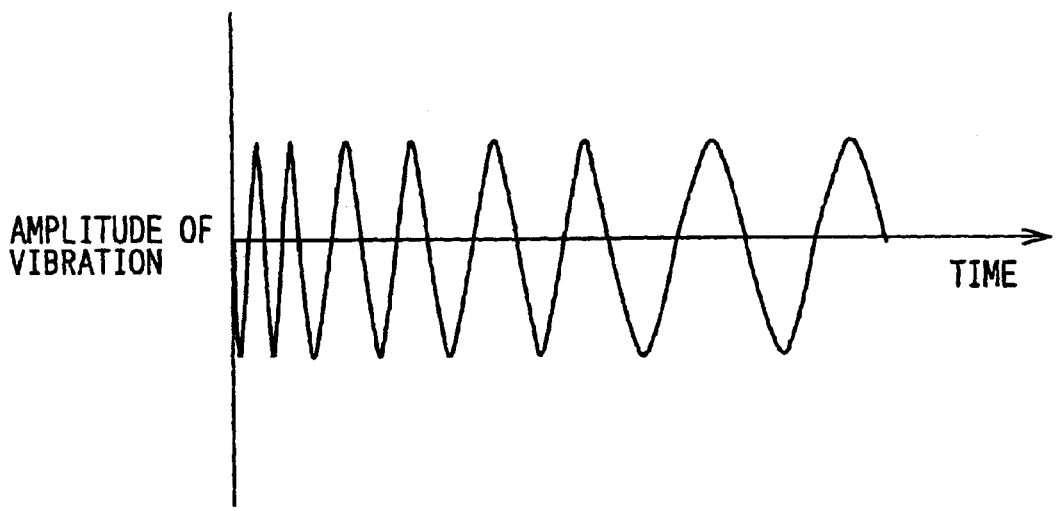
FIG. 10B is graph showing a control example of a moving speed during a vibrating operation of another embodiment of the present invention.

As the method for gradually reducing the moving speed, there may be a method for gradually reducing the amplitude of vibration with the lapse of time, as shown schematically in FIG.. 10A, and a method for gradually reducing a frequency of vibration with the lapse of time, as shown schematically in FIG. 10B. Further, a method for reducing both the amplitude and the frequency of vibration with the lapse of time may be used.

In the case where the moving speed is reduced, it is preferable that the moving speed is reduced by from 10% to 15% for about 15 seconds. The present inventors recognized that by controlling the pressing force and the frequency of vibration at constant values of 0.29 Mpa and 200 Hz, respectively, and by reducing the amplitude of vibration from 0.52 mm to 0.45 mm for 15 seconds, the parts could be appropriately melted and bonded. Further, the pressing force control and the moving speed control may be carried out at the same time.

Further, in the case where after the pressing operation is started, the pressing force applied to the contact surfaces is sharply increased to the predetermined value P1 and then is continuously gradually increased. In addition to the method for increasing the pressing force to the upper limit P2 as shown in FIG. 5, various methods can be utilized.

Figure 14:
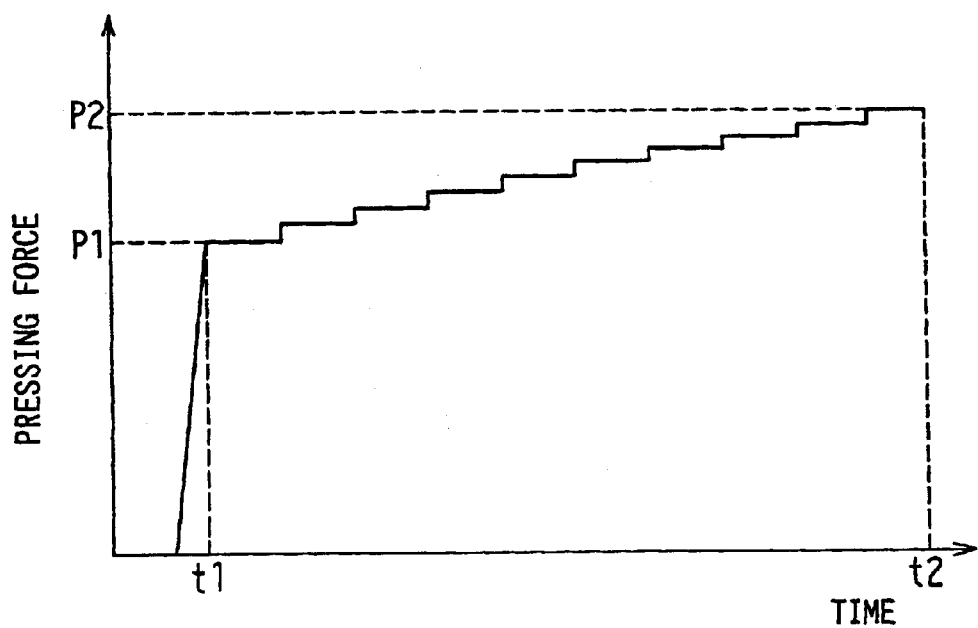
FIG. 14 is a graph showing a pressing force control pattern of another embodiment of the present invention.

For example, as shown in FIG. 14, after the pressing force is sharply increased to the predetermined value P1, the holding and increasing of the pressing force may be performed alternately, thereby increasing the pressing force stepwise. Also by this method, it is possible to increase the pressing force from the predetermined value P1 to the upper limit pressing force P2, gradually. Then, if the pressing force is continuously gradually increased to the time t2 where the vibrating operation is finished, as shown in FIG. 5 and FIG. 14, the pressing force is gradually increased during the period in which vibration is applied. This is preferable because this makes it possible to prevent the resin material from being excessively heated by the vibration-generated heat.

In this connection, in the embodiment shown in FIG. 14, it is not necessary to provide the period in which the pressing force is held and the period in which the pressing force is increased at constant intervals. That is, it is not necessary to make the increasing gradient of the pressing force constant but the increasing gradient of the pressing force may be varied at the middle of the increasing of the pressing force by an arbitrary combination of the holding period and the increasing period.

Figure 15:
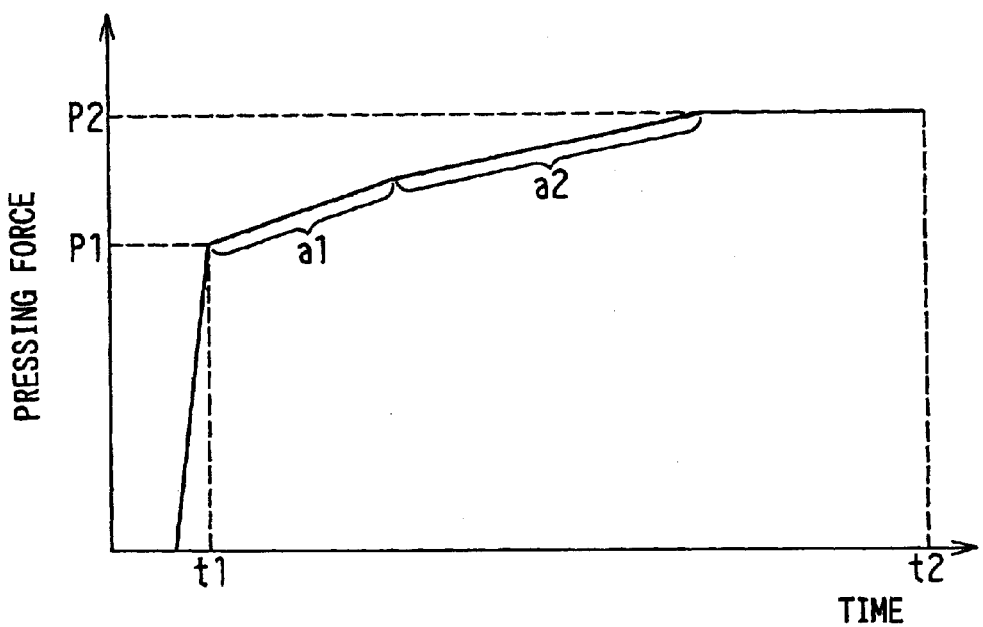
FIG. 15 is a graph showing a pressing force control pattern of another embodiment of the present invention.

FIG. 15 shows an embodiment in which the pressing force is continuously increased and the increasing gradient is changed. According to the embodiment in FIG. 15, the pressing force is sharply increased to the predetermined value P1 and then is increased according to the first increasing gradient a1 smaller than the increasing gradient of the pressing force before the predetermined value P1. Then, after a predetermined time (t3-t1) elapses, the pressing force is increased at the second increasing gradient a2, the gradient a2 being smaller than the first increasing gradient a1.

However, if the pressing force is increased without limit, the pressing force becomes so excessive that it pushes out the resin material from the contact surfaces before the resin material is sufficiently heated, which makes it impossible to produce an acceptable bonding state. Therefore, it is necessary to prevent the pressing force from increasing over the range in which the resin material is sufficiently heated. For this reason, it is effective to create a good bond by ensuring that the upper limit of the pressing force is within a range or at or below a limit where the resin material is sufficiently heated. This is accomplished by setting an upper limit pressing force P2, and after the pressing force reaches the upper limit pressing force P2, the pressing force is held at the constant value of P2.

Figure 11:
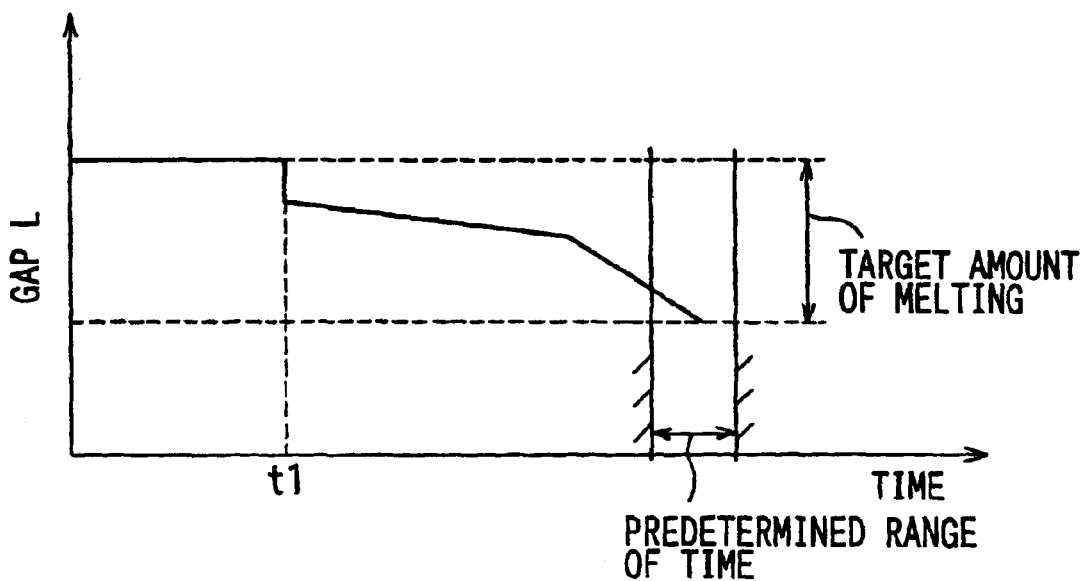
FIG. 11 is a graph showing a method for determining whether the state of melting and bonding is good or not of another embodiment of the present invention.

Further, in the respective embodiments described above, during the vibrating, melting and bonding operation, the control unit 100 monitors the amount of melting of the cover and the case on the basis of a signal from the gap sensor 15. The control unit 100 makes a determination whether the amount of melting is increasing or not with the lapse of time and whether the melting bonding state is good or not according to whether the amount of melting is within the range determined by the upper and lower limits U and J which are increasing or not with the lapse of time. However, for example, as shown in FIG. 11, the control unit 100 may determine whether the melting bonding state is good or not according to whether the target amount of melting is obtained within the predetermined range of time or not.

In the case where the target amount of melting is obtained in a time shorter than the predetermined range of time, the amount of melting per unit time is too large. In such a case, there is the possibility that the resin material yet to be sufficiently heated and melted at the contact surfaces is pushed out from the contact surfaces and that a good melting bonding state is not obtained even if the resin material is cooled and solidified. On the other hand, in the case where the target amount of melting is obtained in a time longer than the predetermined range of time, the amount of melting per unit time is too small. In such a case, there is the possibility that the resin material at the contact surfaces is excessively heated and degraded and that a good melting bonding state is not obtained even if the resin material is cooled and solidified.

Further, in the respective embodiments described above, during the vibrating, melting and bonding operation, the control unit 100 monitors the amount of melting of the cover and the case on the basis of the signal from the gap sensor 15 and determines whether the melting bonding state is good or not. However, for example, the control unit 100 may carry out feedback control according to a general control shown in FIG. 12 in which the pressing force is feedback controlled according to an amount of melting.

Figure 12:
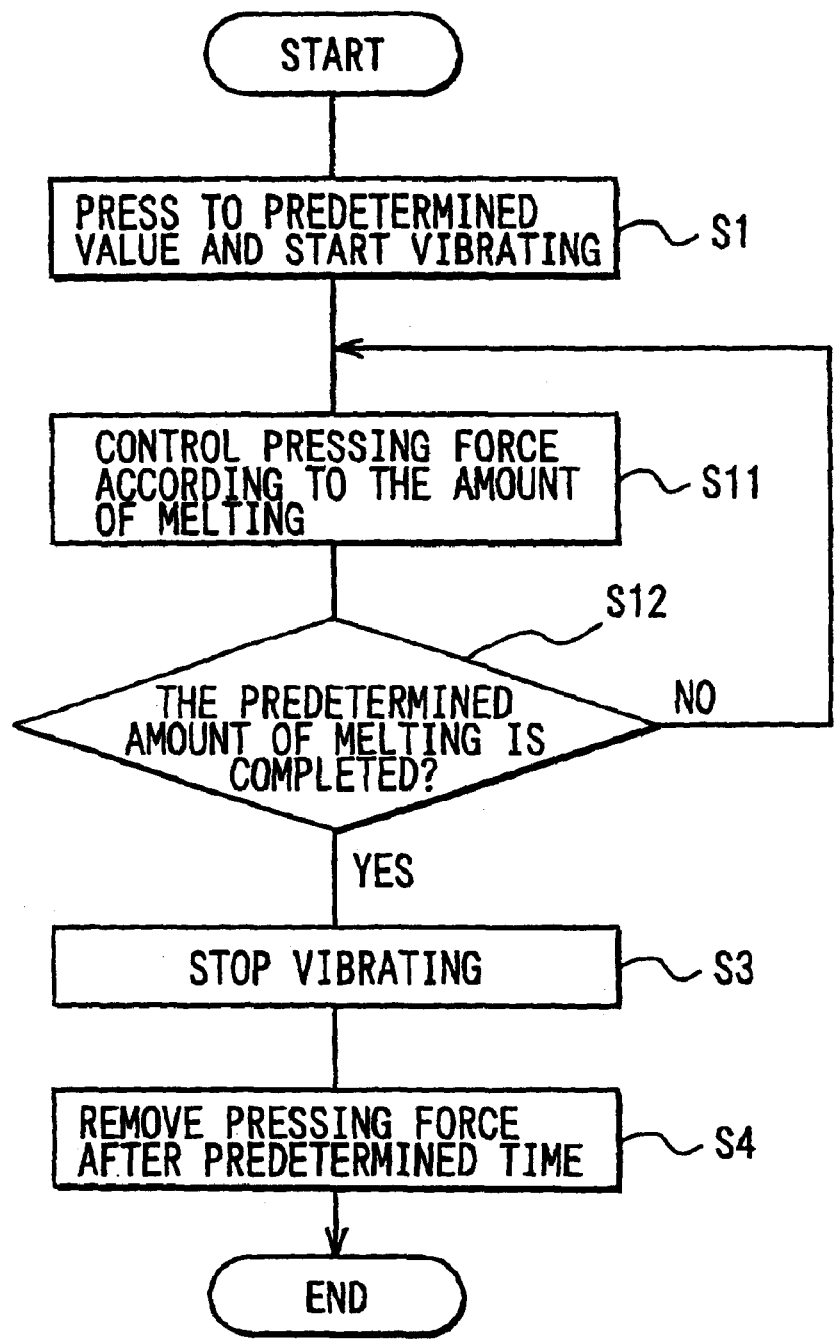
FIG. 12 is a flowchart showing a general control operation of a control unit of another embodiment of the present invention.

As shown in FIG. 12, the following control may be performed: after the pressing force is increased sharply and the vibrating body 5 is vibrated (step S1), a pressing force control according to the amount of melting. That is, a pressing force control in which the gap L between the gap sensor and the table is always within the range MS shown in FIG. 6 is performed until the melting of the predetermined amount of resin material is completed (steps S11 and S12) and then the same control as the controls in the respective embodiments is performed (steps S3 and S4).

Further, while the cover 7 is provided with the plurality of semi-spherical projections 72 on the outer peripheral surface thereof in the respective embodiments described above, the projections are not limited to this type of projections, but they may be a member which is deformed slightly to securely hold the cover 7 by the side surfaces of the holding portion 6a when the cover 7 is pressed into the holding portion 6a. The projections should be able to adequately transmit vibrational energy from the vibrating jig 6 to the cover 7 when the cover 7 and the case 8 are vibrated, melted and bonded to each other. In addition, it is preferred that the member can separate the bonded part from the holding portion 6a after the vibrating, melting and bonding operation is finished.

Figure 13:
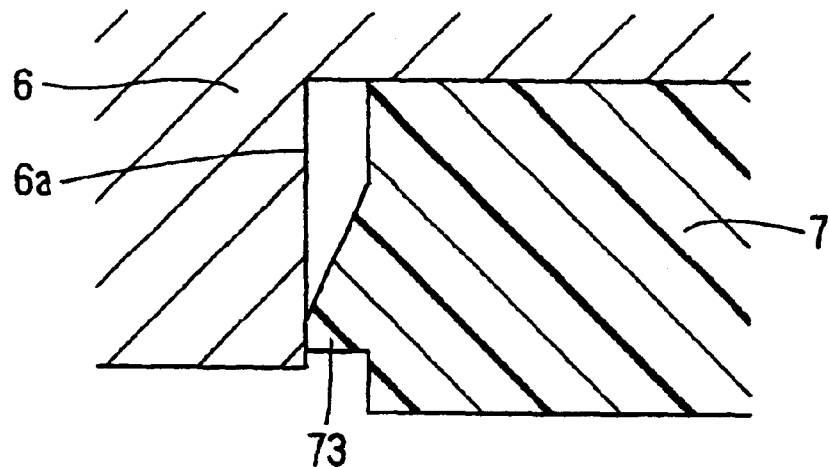
FIG. 13 is a cross-sectional view of a main portion showing the engaging relationship between a vibrating jig and a cover of another embodiment of the present invention.

For example, as shown in FIG. 13, the member may be a tapered projection 73 provided on the outer peripheral surface of the cover 7. The projection 73 may be provided continuously or discontinuously on the entire periphery of the outer peripheral surface.

Still further, in the first and the second embodiments described above, by changing the thickness of the rib between the corner portion 811 and the straight portion 812 of the rib portion 81, the rigidity of each portion of the rib portion 81 is made nearly constant to reduce variations in the state of heating of the rib portion 81. In the third embodiment described above, by changing the height of the contact surfaces between the corner portion 911 and the straight portion 912 of the rib portion 281, a difference in the starting time of generating heat between the two portions is made to reduce variations in the state of heating of the rib portion 281. However, the change in the thickness of the rib portion and the change in the height of the contact surfaces may be combined appropriately so as to reduce the variations in the state of heating of the rib portion.

Still further, in the respective embodiments described above, the actual numerical values such as 1.2 mm, 0.28 Mpa, and the like, are examples and they can be appropriately set according to the shape and the material of the resin parts, various properties of the vibrating, melting bonding machine and the like. They are not necessarily absolute, or required values.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for vibrating, melting and bonding at least two resin parts by making the at least two resin parts abut against each other and vibrating their contact surfaces while applying a pressing force to them, wherein after initially applying the pressing force, the pressing force is sharply increased to a predetermined value and then is gradually increased.

2. A method for vibrating, melting and bonding at least two resin parts according to claim 1, wherein the pressing force is continuously gradually increased until vibrating the contact surfaces is finished.

3. A method for vibrating, melting and bonding at least two resin parts according to claim 1, wherein the pressing force is continuously gradually increased from a predetermined value in a range not exceeding a predetermined upper limit pressing force.

4. A method for vibrating, melting and bonding at least two resin parts according to claim 2, wherein the pressing force is continuously gradually increased from the predetermined value in a range not exceeding a predetermined upper limit pressing force.

5. A method for vibrating, melting and bonding at least two resin parts according to claim 1, wherein the pressing force is continuously gradually increased by a combination of a period in which the pressing force is held at a constant value and a period in which the pressing force is increased.

6. A method for vibrating, melting and bonding at least two resin parts according to claim 2, wherein the pressing force is continuously gradually increased by a combination of a period in which the pressing force is held at a constant value and a period in which the pressing force is increased.

7. A method for vibrating, melting and bonding at least two resin parts according to claim 3, wherein the pressing force is continuously gradually increased by a combination of a period in which the pressing force is held at a constant value and a period in which the pressing force is increased.

8. A method for vibrating, melting and bonding at least two resin parts according to claim 4, wherein the pressing force is continuously gradually increased by a combination of a period in which the pressing force is held at a constant value and a period in which the pressing force is increased.

9. A method for vibrating, melting and bonding at least two resin parts by making the at least two resin parts abut against each other and vibrating their contact surfaces while applying a pressing force to them, wherein after the vibrating of the contact surfaces is started, a moving speed when the contact surfaces are vibrated is sharply increased to a predetermined upper limit and then the moving speed is gradually decreased.

10. A method for vibrating, melting and bonding at least two resin parts by making the at least two resin parts abut against each other and vibrating their contact surfaces while applying a pressing force to them, wherein the position of the first resin part of the two resin parts is measured by an amount of melting of the resin parts at the contact surfaces with reference to the second resin part of the two resin parts, a determination is made whether the amount of melting increases with a lapse of time or not, and on a basis of the determination result, a second determination is made whether a state of melting and bonding of the resin parts is good or not.

11. A method for vibrating, melting and bonding at least two resin parts according to claim 10, wherein the determination result is obtained by determining whether or not the amount of melting is within a range determined by upper and lower limits both of which increase with the lapse of time.

12. A method for vibrating, melting and bonding at least two resin parts according to claim 10, wherein the determination result is obtained by determining whether a target amount of melting is obtained within a predetermined time or not.

13. A method for vibrating, melting and bonding at least two resin parts by making the at least two resin parts abut against each other and vibrating their contact surfaces while applying a pressing force to them, wherein the contact surface is formed so as to make rigidity of a first resin part of the at least two resin parts nearly uniform at each portion of the contact surface.

14. A method for vibrating, melting and bonding at least two resin parts by making the at least two resin parts abut against each other and vibrating their contact surfaces while applying a pressing force to them, wherein a first resin part of the at least two resin parts has a projection on its outer peripheral surface, the first resin part being pressed into the holding portion of a vibrating jig to fix the vibrating jig, and the vibrating jig is vibrated in this state to vibrate the contact surfaces; and wherein when the contact surface has a polygonal shape, a thickness of the resin part at a corner portion is made thinner than a thickness of the resin part at a straight portion to make rigidity of the resin part nearly uniform at each portion of the contact surface.

15. A method for vibrating, melting and bonding at least two resin parts by making the at least two resin parts abut against each other and vibrating their contact surfaces while applying a pressing force to them, wherein a first resin part of the at least two resin parts has a projection on its outer peripheral surface, the first resin part being pressed into the holding portion of a vibrating jig to fix the vibrating jig, and the vibrating jig is vibrated in this state to vibrate the contact surfaces; and wherein in a state where the first resin part is fixed to a vibrating jig and the second resin part is fixed to a stationary jig, the vibrating jig is vibrated to vibrate the contact surfaces, the second resin part has a polygonal rib portion whose top surface is the contact surface, and a thickness of a rib portion at its corner portion is made thinner than a thickness of a rib portion at its corner portion is made thinner than a thickness of the rib portion at a straight portion to make rigidity of the second resin part nearly uniform at each portion of the contact surface.

16. A method for vibrating, melting and bonding at least two resin parts by making the at least two resin parts abut against each other and vibrating their contact surfaces while applying a pressing force to them, wherein the second resin part has a step at a contact surface and a portion, having a higher rigidity of the second resin part at the contact surface, is projected from a portion, having a lower rigidity of the second resin part at the contact surface.

* * * * *